(12) United States Patent
Koch

(10) Patent No.: US 10,448,629 B2
(45) Date of Patent: Oct. 22, 2019

(54) TURKEY CALL

(71) Applicant: Charles Koch, Lexington, VA (US)

(72) Inventor: Charles Koch, Lexington, VA (US)

( * ) Notice: Subject to any disclaimer, the term of this patent is extended or adjusted under 35 U.S.C. 154(b) by 169 days.

(21) Appl. No.: 15/846,648

(22) Filed: Dec. 19, 2017

(65) Prior Publication Data
US 2019/0183111 A1 Jun. 20, 2019

(51) Int. Cl.
*A01M 31/00* (2006.01)
*G10K 3/00* (2006.01)

(52) U.S. Cl.
CPC ............. *A01M 31/004* (2013.01); *G10K 3/00* (2013.01)

(58) Field of Classification Search
CPC .............................. A01M 31/004; G10K 3/00
USPC .............................................................. 43/2
See application file for complete search history.

(56) References Cited

U.S. PATENT DOCUMENTS

| | | | | |
|---|---|---|---|---|
| 2,958,157 A * | 11/1960 | Tannehill | ............ | A01M 31/004 446/397 |
| 4,648,852 A * | 3/1987 | Wingate | ............... | A01M 31/004 446/397 |
| 4,854,914 A * | 8/1989 | White, Jr. | ............ | A01M 31/004 446/402 |
| 4,904,221 A | 2/1990 | Taylor | | |
| 5,178,575 A * | 1/1993 | Koch | ................... | A01M 31/004 446/170 |
| 5,484,319 A | 1/1996 | Battey | | |
| 5,529,526 A * | 6/1996 | Wesley | ................ | A01M 31/004 446/397 |
| 6,676,479 B1 * | 1/2004 | Zimmerman | ....... | A01M 31/004 446/397 |
| 7,308,994 B1 * | 12/2007 | Vanicek | ............... | A01M 31/004 206/315.11 |
| 7,785,169 B2 | 8/2010 | Moss | | |
| 10,085,440 B1 * | 10/2018 | Williams | ............ | A01M 31/004 |
| D843,870 S * | 3/2019 | Williams | ................... | D10/119.1 |
| 2005/0075042 A1 * | 4/2005 | Vaicunas | ............. | A01M 31/004 446/418 |
| 2008/0020674 A1 * | 1/2008 | Olinde | ................ | A01M 31/004 446/397 |
| 2008/0171490 A1 * | 7/2008 | Kinser | ................ | A01M 31/004 446/404 |
| 2008/0261485 A1 * | 10/2008 | Coffield | .............. | A01M 31/004 446/397 |
| 2008/0280525 A1 * | 11/2008 | Carr | ..................... | A01M 31/004 446/397 |
| 2009/0258569 A1 * | 10/2009 | Wade | .................. | A01M 31/004 446/418 |

(Continued)

*Primary Examiner* — Christopher P Ellis
(74) *Attorney, Agent, or Firm* — Stuart I. Smith; Roberts Mlotkowski Safran Cole & Calderon, P.C.

(57) ABSTRACT

An animal call is provided that has a main body having an upper member, and an open end, the upper member having an upper surface and a lower surface; a cavity in the main body that is open to an environment outside of the main body through the open end of the main body; an opening in the upper member of the main body; and a sound generating member having an upper surface and a lower surface, a first portion of the upper surface of the sound generating member being attached to the lower surface of the upper member of the main body, and a second portion of the sound generating member is a striking surface that is accessible through the opening in the upper member of the main body.

15 Claims, 6 Drawing Sheets

(56) References Cited

U.S. PATENT DOCUMENTS

| | | | |
|---|---|---|---|
| 2010/0151769 A1* | 6/2010 | Coffield | A01M 31/004 446/418 |
| 2010/0178843 A1* | 7/2010 | Peel | A01M 31/004 446/397 |
| 2010/0273393 A1* | 10/2010 | Burcham | A01M 31/004 446/421 |
| 2011/0065356 A1* | 3/2011 | Blodgett | A01M 31/004 446/397 |
| 2011/0171877 A1* | 7/2011 | Dukart | A01M 31/004 446/397 |
| 2012/0045963 A1* | 2/2012 | Moss | A01M 31/004 446/418 |
| 2014/0106643 A1* | 4/2014 | Powers | A01M 31/004 446/418 |
| 2015/0335008 A1* | 11/2015 | Steinmetz | A01M 31/004 446/397 |
| 2016/0081324 A1* | 3/2016 | Patton | A01M 31/004 446/418 |
| 2016/0316741 A1* | 11/2016 | Rouse | A01M 31/004 |
| 2017/0261604 A1* | 9/2017 | Van Voorst | G01S 7/51 |
| 2017/0280704 A1* | 10/2017 | Foster | A01M 31/004 |
| 2018/0049428 A1* | 2/2018 | Burcham | A01M 31/004 |

\* cited by examiner

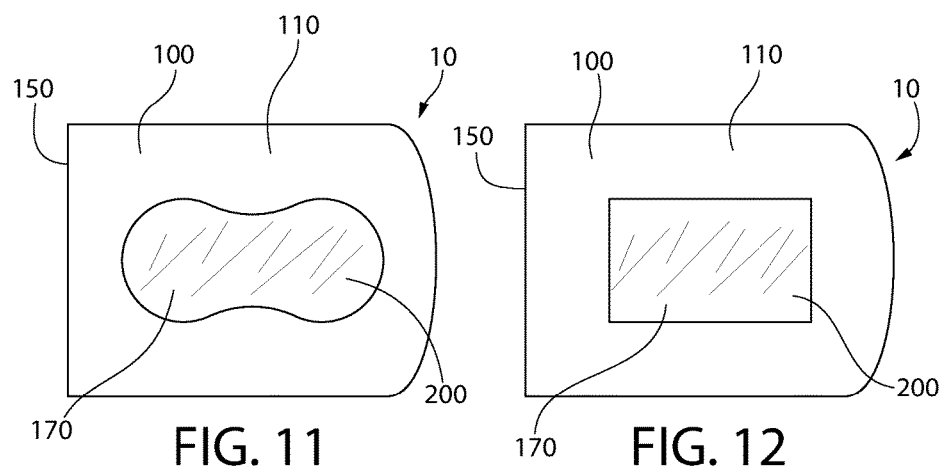
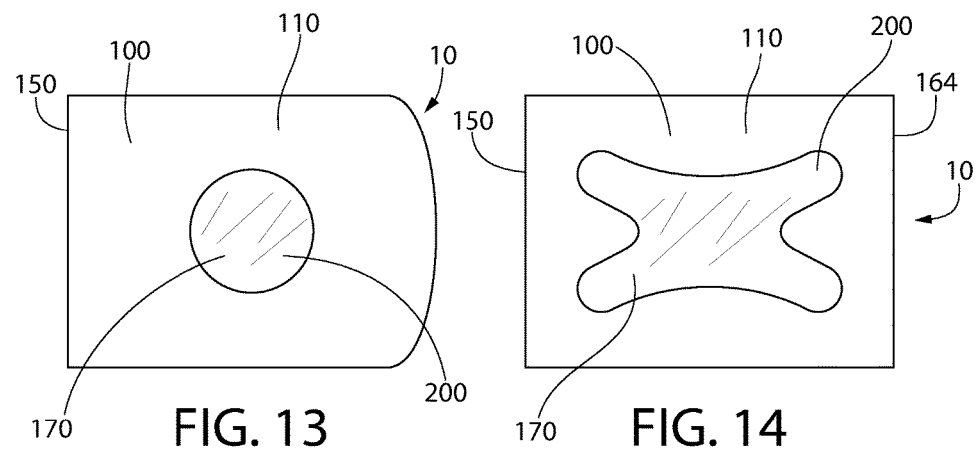

TURKEY CALL

FIELD

The present invention relates generally to animal calls. Particular embodiments of the invention relate to animal calls that are suited to attract turkeys.

BACKGROUND

There are many turkey hunters and bird watchers that are constantly looking for a device that produces a more realistic call that will result in them seeing more turkeys in the wild. Many calls exist on the market today that are used to call turkeys, but there is a need for a more realistic call. In addition, mechanical calls that exist on the market today are not directional in that they simply send out sound in all or most directions. It is advantageous to be able to direct the call sound in a particular direction to call in a specific turkey that has been heard by a user of the call.

Accordingly, an improved turkey call that provides more realistic turkey sounds that can be aimed in a particular direction is desirable.

SUMMARY

A turkey call in accordance with embodiments of the invention includes a main body and a sound generating member that creates sound in a cavity in the main body. The sound exits the main body through an opening in the main body. The sound can be directed in a particular direction by pointing the opening in that direction.

In one aspect, an animal call has a main body having an upper member, and an open end, the upper member having an upper surface and a lower surface; a cavity in the main body that is open to an environment outside of the main body through the open end of the main body; an opening in the upper member of the main body; and a sound generating member having an upper surface and a lower surface, a first portion of the upper surface of the sound generating member being attached to the lower surface of the upper member of the main body, and a second portion of the sound generating member is a striking surface that is accessible through the opening in the upper member of the main body.

In some embodiments, the main body further comprises a lower member, the cavity being located between the upper member and the lower member, a first side member and a second side member, the cavity being located between the first side member and the second side member, and a closed end, the cavity being located between the closed end and the open end.

In some embodiments, the upper member, the lower member, the first side, the second side, the closed end, and the sound generating member are all fixed relative to each other.

In some embodiments, the sound generating member prevents air from passing through the opening in the upper member of the main body.

In some embodiments, the open end is the only opening in the main body through which the cavity is fluidly connected to an environment outside of the cavity.

In some embodiments, the upper member is parallel to the lower member, the first side member is parallel to the second side member, and the closed end is perpendicular to the upper member, the lower member, the first side member and the second side member.

In some embodiments, the cavity is a rectangular parallelepiped.

In some embodiments, the first portion of the sound generating member is permanently fixed to the lower surface of the upper member.

In some embodiments, the sound generating member is a plate having a thickness in a direction perpendicular to the upper member of the main body, and the thickness of the sound generating member is uniform across the entire sound generating member.

In some embodiments, the upper member of the main body has a thickness in a direction parallel to the thickness of the sound generating member, and the thickness of the sound generating member is smaller than the thickness of the upper member of the main body.

In some embodiments, the sound generating member is a different material than the main body.

In some embodiments, the sound generating member is slate.

In another aspect, animal call includes a main body having an open end; a cavity in the main body that is open to an environment outside of the main body only through the open end of the main body; and a sound generating member permanently fixed to the main body and having a first side and a second side, the first side being physically accessible from outside the main body, the second side being in the cavity. The main body and the sound generating member are fixed relative to each other.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 11 is a top view of an alternate embodiment of the invention;

FIG. 12 is a top view of an alternate embodiment of the invention;

FIG. 13 is a top view of an alternate embodiment of the invention; and

FIG. 14 is a top view of an alternate embodiment of the invention.

Figure 1:
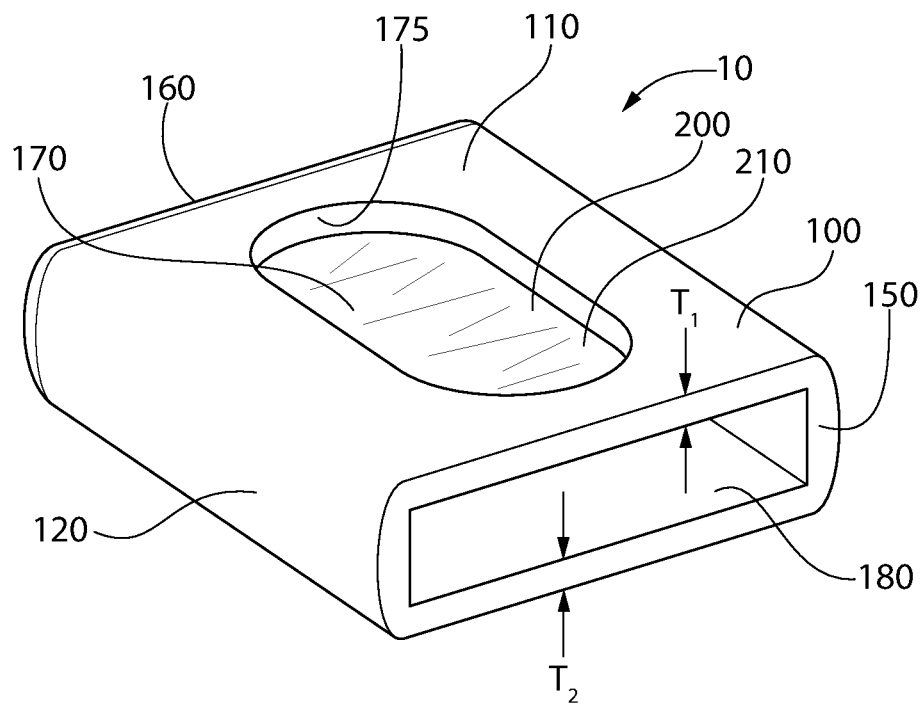
FIG. 1 is a perspective view of a turkey call in accordance with exemplary embodiments of the invention.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The following description of the preferred embodiment(s) is merely exemplary in nature and is in no way intended to limit the invention, its application, or uses.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "connected," "coupled," "interconnected," and similar refer to a relationship wherein structures are secured or attached to one another either directly or indirectly through intervening structures, as well as both movable or rigid attachments or relationships, unless expressly described otherwise. The term "fixed" refers to two structures that cannot be separated without damaging one of the structures. The term "filled" refers to a state that includes completely filled or partially filled.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

As stated above, a turkey call in accordance with embodiments of the invention includes a main body and a sound generating member that creates sound in a cavity in the main body. The sound exits the main body through an opening in the main body. The sound can be directed in a particular direction by pointing the opening in that direction.

FIG. 1 shows a turkey call 10 in accordance with exemplary embodiments of the invention. Turkey call 10 has a main body 100 that is, in this example, made of wood. Various types of wood can be used such as, for example, cherry, rose wood, oak, or any other type of wood that produces the desired tone. Main body 100 has a top 110, a left side 120, a right side 130, a bottom 140, an open end 150, and a closed end 160. Open end 150 has an opening 180 that is, in this example, the entire open end. A cavity inside main body 100 is bounded by top 110, sides 120, 130, bottom 140, open end 150, and closed end 160. It is within the cavity that sound waves are created and reverberated to produce the unique sounds of the invention. These sound waves exit turkey call 10 through opening 180 and are directed by pointing opening 180 in the direction in which the user desires the call to be projected. Particularly desirable sounds are produced when opening 180 is not blocked or limited by any of top 110, sides 120, 130 or bottom 140 extending over opening 180; In other words, when opening 180 has the same cross-section as the cavity. In this example, main body 100 is approximately 4" long by approximately 3½" wide by approximately 1" thick. However, other dimensions and other ratios of dimensions can also be used.

Top 110 has an opening 170 that provides access to an upper surface 210 of a sound generating member 200. In this example, sound generating member 200 is made from a solid piece of slate. In this example, upper surface 210 of sound generating member 200 is textured to produce the desired sounds. Other examples of the sound generating member are made from a frosted glass, or other textured material that properly reverberates when stroked with a striker (discussed in more detail below). Sound generating member 200, in this example, is adhered to the underside of top 110 of main body 100 with a glue or other adhesive or bonding method such that sound generating member 200 completely covers opening 170 in main body 100. An edge 175 of opening 170 is shown in FIG. 1. In this example, top 110 has a uniform thickness $T_1$ across all of top 110. It is understood that the term "uniform thickness" means that there may be chamfering or other conditions at the inside and/or outside corners between top 110 and sides 120, 130 and between top 110 and closed end 160.

Figure 2:
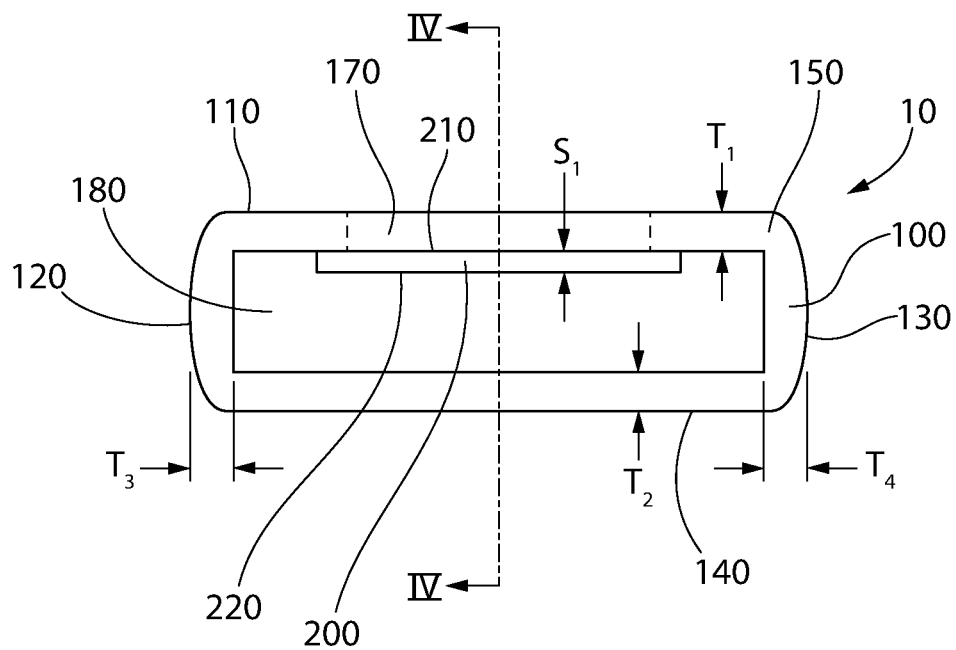
FIG. 2 is a front view of the turkey call of FIG. 1.

FIG. 2 is an end view of turkey call 10 showing open end 150 and opening 180. The cavity is, in this example substantially rectangular in cross-section. The term "substantially" in this case is understood to mean that chamfering or other conditions at the inside corners between top 110 and sides 120, 130; between closed end 160 and top 110, sides 120, 130 and bottom 140; and between bottom 140 and sides 120, 130 may exist. As can be seen in FIG. 2, sound generating member 200 is attached to the underside of top 110 and extends downward into the cavity. In this example, a lower surface 220 of sound generating member 200 is parallel to an upper surface of bottom 140 (see also FIG. 4). In this example, sound generating member 200 has a thickness $S_1$ that is uniform. In other examples, thickness $S_1$ can vary. In this example, thickness $S_1$ of sound generating member 200 is smaller than thickness $T_1$ of top 110 of main body 100. Making thickness $S_1$ of a slate sound generating member 200 smaller than thickness $T_1$ of top 110 of main body 100 provides a very desirable call sound. In other examples, thickness $S_1$ of sound generating member 200 is equal to or larger than thickness $T_1$ of top 110 of main body 100. In this example, thicknesses $T_1$ and $T_2$ are approximately ⅛". However, different thicknesses can be used. In this example, thickness $S_1$ is 3/16". However, in some examples thickness $S_1$ can be in the range between ⅛" and ¼". In this example, sound generating member 200 is approximately 3" by 1⅝". However, other sizes of sound generating member 200 can be used.

FIG. 2 shows side 120 having a thickness $T_3$ and side 130 having a thickness $T_4$ that are equal. Other examples have thickness $T_3$ being a different size than thickness $T_4$. In this example, thicknesses $T_1$ and $T_2$ are slightly smaller than thicknesses $T_3$ and $T_4$ to allow for rounding of the outside corners of call 10 without adversely affecting the structural integrity of call 10. In other examples, thicknesses $T_1$, $T_2$, $T_3$ and $T_4$ are all equal or substantially equal.

Figure 3:
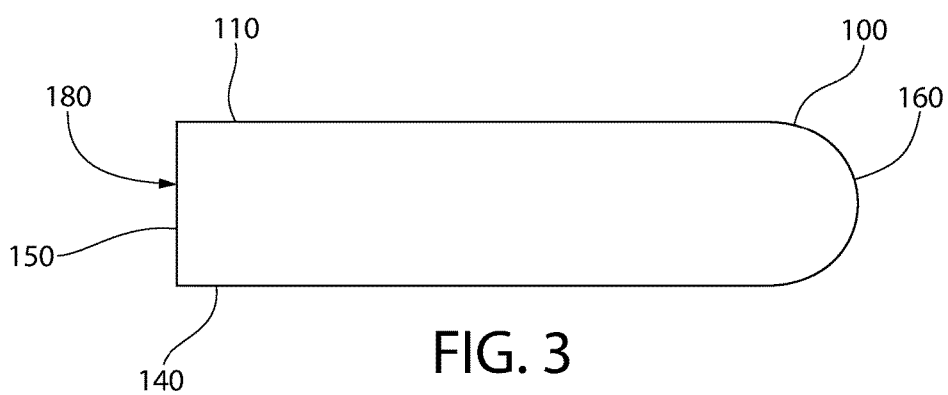
FIG. 3 is a side view of the turkey call of FIG. 1.

FIG. 3 is a side view of turkey call 10 showing side 130. In this example, closed end 160 is rounded to a semi-circular cross-section. In other examples, closed end 160 can be more or less curved, or can be a square cross-section with rounded or sharp corners. In this example, open end 150 is a square cross-section forming vertical faces of top 110, sides 120, 130, and bottom 140. Other examples can have rounded inside and/or outside corners.

Figure 4:
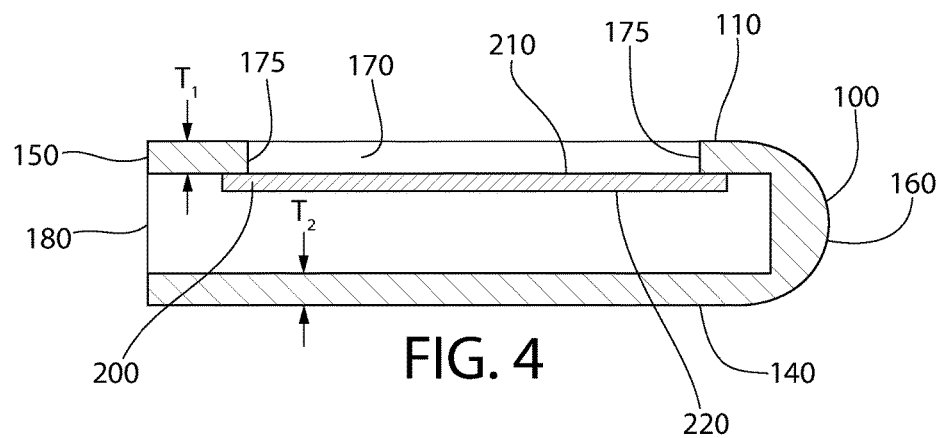
FIG. 4 is a sectional view of the turkey call of FIG. 1.

FIG. 4 is a sectional view along section line IV-IV in FIG. 2. FIG. 2 shows the relationship between sound generating member 200 and top 110 of main body 100 in that sound generating member 200 completely covers opening 170 in top 110. In this example, no air can pass from the cavity through opening 170. In this example, the air only passage from the cavity to the environment outside of turkey call 10 is opening 180 in open end 150. This configuration provides a directional call that can be aimed by the user in the direction in which the user desires the call sound to propagate. For example, a user might want to direct the call at a particular tom that he has heard as opposed to another (maybe smaller) tom that he has also heard, therefore increasing his/her chances of bringing home a turkey big enough for the entire family on Thanksgiving. This is an important distinction from other turkey calls that do not provide a way to direct the call sound in a particular direction.

Figure 8:
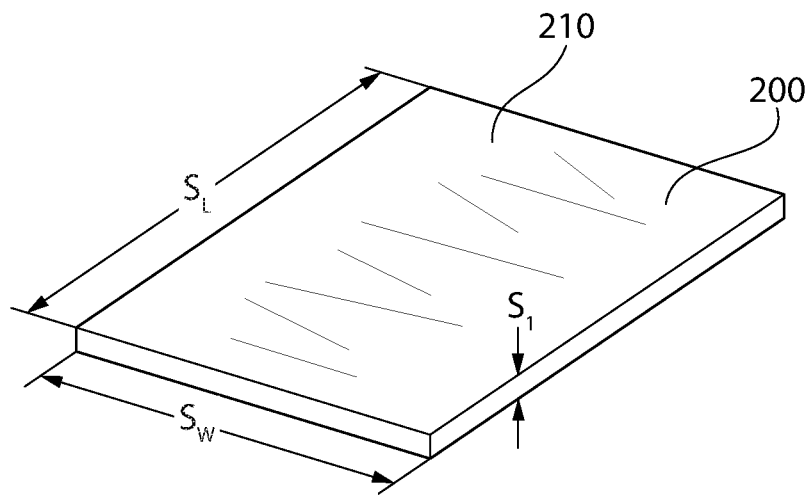
FIG. 8 is a perspective view of a slate in accordance with embodiments of the invention.

In this example, FIGS. 2 and 4 shown sound generating member 200 as being rectangular (see also FIG. 8). It is noted that other shapes that mimic the shape of opening 170 (but larger than opening 170 to provide bonding surfaces), or any other shape, can also be used.

Figure 5:
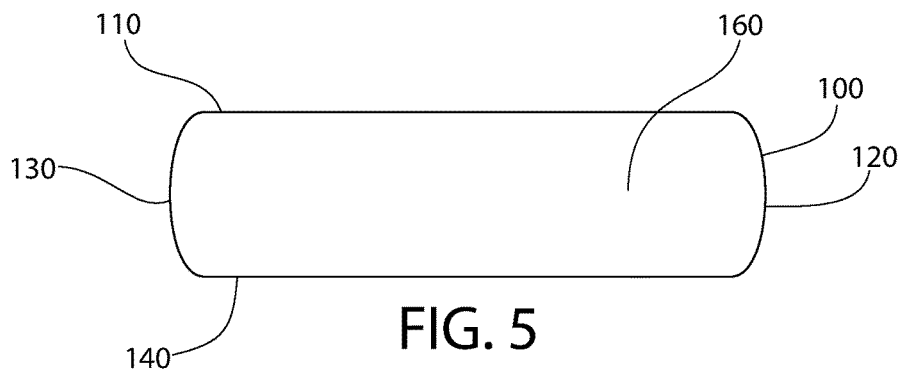
FIG. 5 is a rear view of the turkey call of FIG. 1.

FIG. 5 is an end view of main body 100 showing closed end 160. In this example, side 120 and side 130 have the same cross-sectional shape that is slightly curved. This is one shape that provides comfortable gripping surfaces for the user's hand. While sides 120, 130 can have a square cross-sectional shape, such a shape provides less comfortable gripping surfaces. FIG. 5 also shows the closed nature of closed end 160.

Figure 6:
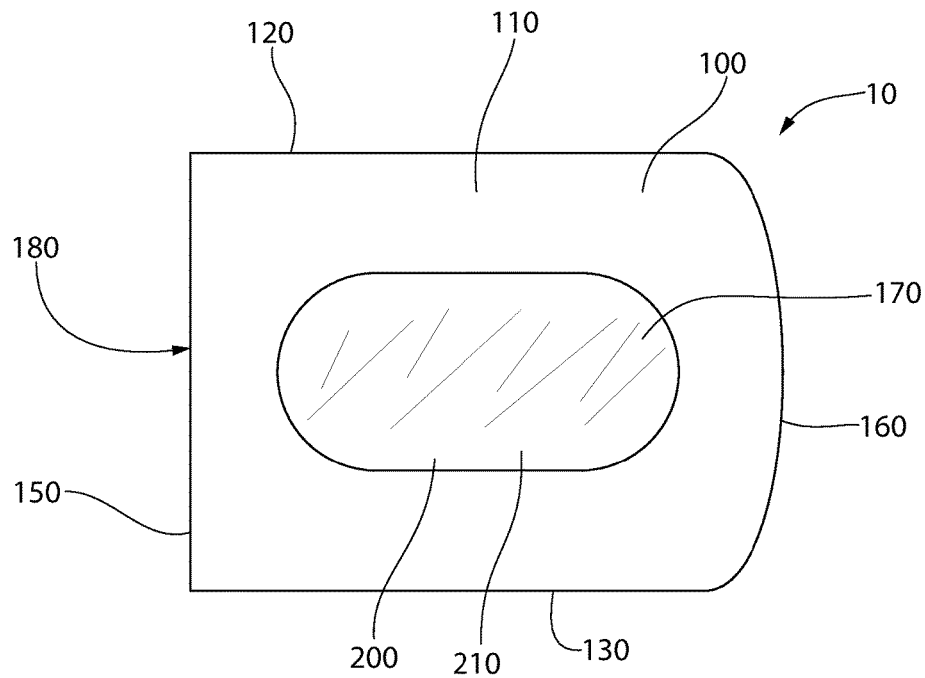
FIG. 6 is top view of the turkey call of FIG. 1.

FIG. 6 is a top view of turkey call 10 showing top 110 of main body 100 and upper surface 210 of sound generating member 200. In this example, the shape of opening 170 is established by two circles connected by two parallel tangent lines. Other shapes can be used for opening 170 as long as the resulting call sounds sufficiently mimic a live turkey.

Figure 7:
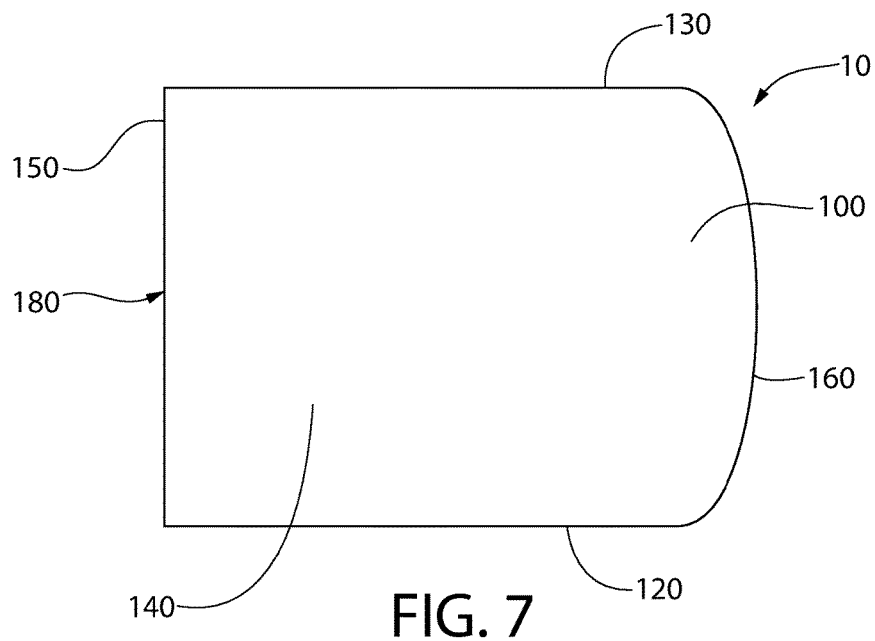
FIG. 7 is a bottom view of the turkey call of FIG. 1.

FIG. 7 is a bottom view of turkey call 10 showing bottom 140 of main body 100.

Figure 9:
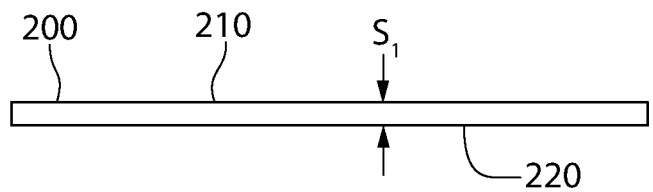
FIG. 9 is a side view of the slate of FIG. 8.
Figure 10:
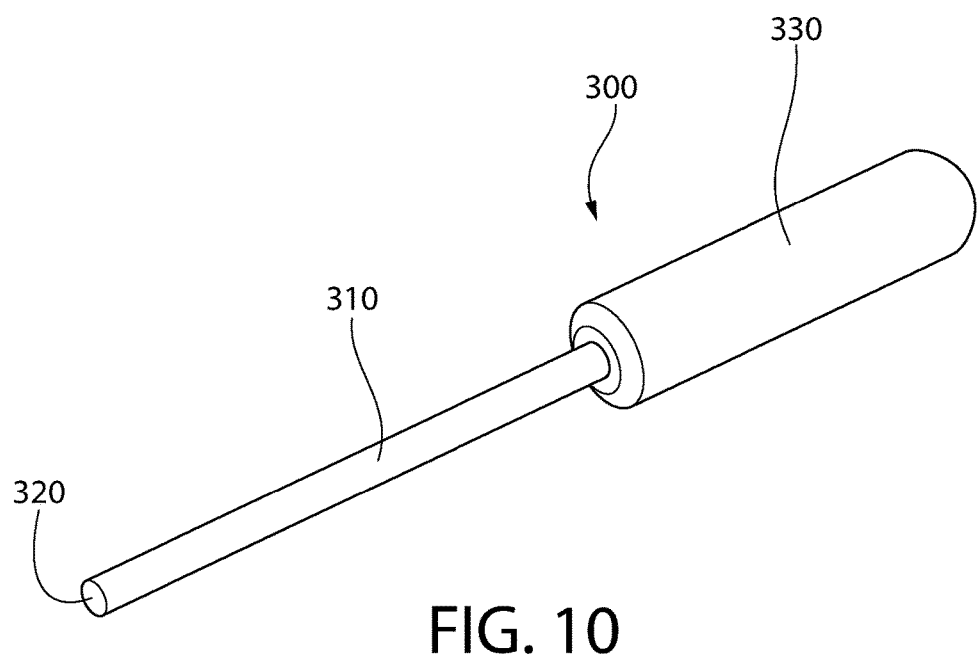
FIG. 10 is a perspective view of a striker in accordance with embodiments of the invention.

FIGS. 8 and 9 show an example of sound generating member 200. FIG. 10 shows an example of a striker 300 that is drawn across upper surface 210 of sound generating member 200 to produce the desired call sound. Striker 10, in this example, has a rod 310 having an end 320, and a handle 330. Striker 10 can be a single piece of material such as, for example, wood, or rod 310 and handle 330 can be separate pieces that are bonded together. In some examples, rod 310 and handle 330 are different materials.

In the example of FIGS. 8 and 9, sound generating member 200 is rectangular and has a uniform thickness $S_1$. In other examples, sound generating member 200 has a different shape and/or has a thickness that varies. In this example, sound generating member 200 is a single piece of slate having a textured upper surface 210. The texture of upper surface 210 interacts with an end 320 of striker 300 when end 320 of striker 300 is drawn across upper surface 210 of sound generating member 200 to cause a vibration that propagates in the cavity and is, in turn, projected out of opening 180. The texture of upper surface 210 can be the result of machine marks from cutting a slate block into pieces of the desired thickness S1, or it can be the result of a surface treatment performed before or after sound generating member 200 is cut to size. Some non-limiting examples of a surface treatment for slate, glass, or other material are chemical etching, mechanical etching, and media blasting.

FIGS. 11, 12, 13 and 14 are non-limiting examples of different shapes of opening 170 in top 110. These different shapes can produce different call sounds when end 320 of striker 300 is drawn across different locations on sound generating member 200. Sound generating member 200 will vibrate differently depending on how restrained sound generating member 200 is by its bonding to top 110 at a given location. Different shape openings 170 (especially when sound generating member 200 is bonded at the perimeter of opening 170) can produce different call sounds because sound generating member 200 is more or less restrained at a given location.

Different sounds and tones can be produced by embodiments of the invention in several ways. For example, changing the tension as the user holds the striker will make the sound more or less intense. More tension (a tighter grip) will create a louder, sharper tone for when the gobbler is at a far distance. Less tension will create a softer, more subtle tone for when the bird is at a closer distance. Sounds can also be modified by striking different areas of sound generating member 200. Striking sound generating member 200 closer to opening 180 will create higher sounds. Striking sound generating member 200 closer to closed end 160 will create lower, raspier sounds.

Volume and tone can also be modified by partially blocking opening 180. A more subdued, softer tone can be achieved by cupping one hand loosely in front of opening 180. By changing the position of the hand, variations in the sounds produced can be modified quickly and easily.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents. In addition, all combinations of any and all of the features described in the disclosure, in any combination, are part of the invention.

What is claimed is:

1. An animal call, comprising:
   a main body having an upper member, and an open end, the upper member having an upper surface and a lower surface;
   a cavity in the main body that is open to an environment outside of the main body through the open end of the main body;
   an opening in the upper member of the main body; and
   a sound generating member having an upper surface and a lower surface, a first portion of the upper surface of the sound generating member being attached to the lower surface of the upper member of the main body, and a second portion of the sound generating member is a striking surface that is accessible through the opening in the upper member of the main body.

2. The animal call of claim 1, wherein the main body further comprises
- a lower member, the cavity being located between the upper member and the lower member,
- a first side member and a second side member, the cavity being located between the first side member and the second side member, and
- a closed end, the cavity being located between the closed end and the open end.

3. The animal call of claim 2, wherein the upper member, the lower member, the first side, the second side, the closed end, and the sound generating member are all fixed relative to each other.

4. The animal call of claim 3, wherein the sound generating member prevents air from passing through the opening in the upper member of the main body.

5. The animal call of claim 4, wherein the open end is the only opening in the main body through which the cavity is fluidly connected to an environment outside of the cavity.

6. The animal call of claim 5, wherein the upper member is parallel to the lower member,
- the first side member is parallel to the second side member, and
- the closed end is perpendicular to the upper member, the lower member, the first side member and the second side member.

7. The animal call of claim 6, wherein the cavity is a rectangular parallelepiped.

8. The animal call of claim 5, wherein the first portion of the sound generating member is permanently fixed to the lower surface of the upper member.

9. The animal call of claim 1, wherein the sound generating member prevents air from passing through the opening in the upper member of the main body.

10. The animal call of claim 1, wherein the open end is the only opening in the main body through which the cavity is fluidly connected to the environment outside of the cavity.

11. The animal call of claim 1, wherein the first portion of the sound generating member is permanently fixed to the lower surface of the upper member.

12. The animal call of claim 1, wherein
- the sound generating member is a plate having a thickness in a direction perpendicular to the upper member of the main body, and
- the thickness of the sound generating member is uniform across the entire sound generating member.

13. The animal call of claim 12, wherein the upper member of the main body has a thickness in a direction parallel to the thickness of the sound generating member, and
- the thickness of the sound generating member is smaller than the thickness of the upper member of the main body.

14. The animal call of claim 1, wherein the sound generating member is a different material than the main body.

15. The animal call of claim 14, wherein the sound generating member is slate.

* * * * *